(12) United States Patent
Anderson

(10) Patent No.: US 7,601,067 B2
(45) Date of Patent: Oct. 13, 2009

(54) DUAL HINGE MOUNTING ARRANGEMENT

(75) Inventor: Brian M. Anderson, Grand Rapids, MI (US)

(73) Assignee: SPEC International, Inc., Grand Rapids, MI (US)

( * ) Notice: Subject to any disclaimer, the term of this patent is extended or adjusted under 35 U.S.C. 154(b) by 925 days.

(21) Appl. No.: 11/073,957

(22) Filed: Mar. 7, 2005

(65) Prior Publication Data

US 2006/0199647 A1 Sep. 7, 2006

(51) Int. Cl.
*A63F 9/24* (2006.01)
*A63F 13/00* (2006.01)
*G06F 17/00* (2006.01)
*G06F 19/00* (2006.01)
*A47B 88/06* (2006.01)
*A47B 88/00* (2006.01)
*A47B 95/00* (2006.01)

(52) U.S. Cl. .................. 463/46; 312/294; 312/300; 312/302

(58) Field of Classification Search .............. 463/36, 463/37, 30, 47
See application file for complete search history.

(56) References Cited

U.S. PATENT DOCUMENTS

| | | | |
|---|---|---|---|
| 4,344,660 A * | 8/1982 | Molnar et al. | 312/249.13 |
| 4,440,457 A | 4/1984 | Fogelman et al. | |
| 4,453,789 A * | 6/1984 | Gullong | 312/324 |
| 4,718,672 A | 1/1988 | Okada | |
| 4,940,297 A * | 7/1990 | Borgen | 312/138.1 |
| 5,515,959 A | 5/1996 | Stephenson, III et al. | |
| 5,544,595 A | 8/1996 | Stephenson, III et al. | |
| 5,631,805 A | 5/1997 | Bonsall | |
| 5,636,101 A | 6/1997 | Bonsall et al. | |
| D388,469 S | 12/1997 | Dickenson et al. | |
| 5,722,891 A | 3/1998 | Inoue | |
| 5,752,881 A | 5/1998 | Inoue | |
| 5,813,914 A | 9/1998 | McKay et al. | |
| 5,836,819 A | 11/1998 | Ugawa | |
| D404,077 S | 1/1999 | Dickenson et al. | |
| 5,861,874 A * | 1/1999 | Joto | 345/173 |
| 5,967,287 A | 10/1999 | Cole | |
| 6,019,207 A | 2/2000 | Cole | |
| D424,122 S | 5/2000 | Dickenson et al. | |
| 6,068,101 A | 5/2000 | Dickenson et al. | |
| 6,135,884 A | 10/2000 | Hedrick et al. | |
| 6,164,098 A * | 12/2000 | Hommes | 70/78 |
| 6,164,645 A | 12/2000 | Weiss | |
| 6,198,515 B1 | 3/2001 | Cole | |
| 6,200,213 B1 | 3/2001 | Cole | |
| 6,219,229 B1 | 4/2001 | Lee | |
| 6,315,666 B1 | 11/2001 | Mastera et al. | |
| 6,368,216 B1 | 4/2002 | Hedrick et al. | |
| 6,382,749 B1 * | 5/2002 | Stetson | 312/308 |
| D460,496 S | 7/2002 | Cole | |
| 6,474,645 B2 | 11/2002 | Tarantino | |
| 6,475,087 B1 | 11/2002 | Cole | |

(Continued)

*Primary Examiner*—John M Hotaling
*Assistant Examiner*—Kevin Y Kim
(74) *Attorney, Agent, or Firm*—Price, Heneveld, Cooper, DeWitt & Litton, LLP

(57) ABSTRACT

A cabinet for gaming machines and the like includes a pair of doors that are pivotably mounted to the cabinet by a pair of hinges. At least one of the doors includes a flange adjacent the hinges that provides a smooth, uncluttered appearance and hides the door hinges and associated mounting hardware from view.

20 Claims, 6 Drawing Sheets

U.S. PATENT DOCUMENTS

| | | |
|---|---|---|
| D470,895 S | 2/2003 | Cole |
| 6,533,273 B2 | 3/2003 | Cole et al. |
| 6,582,301 B2 | 6/2003 | Hill |
| 6,590,176 B2 | 7/2003 | Cole et al. |
| 6,605,001 B1 | 8/2003 | Tarantino |
| 6,612,574 B1 | 9/2003 | Cole et al. |
| 6,612,575 B1 | 9/2003 | Cole et al. |
| 6,623,006 B2 | 9/2003 | Weiss |
| 6,656,047 B1 | 12/2003 | Tarantino et al. |
| 6,676,514 B1 * | 1/2004 | Kusuda et al. ............... 463/24 |
| 6,688,984 B2 | 2/2004 | Cole |
| 6,702,409 B2 | 3/2004 | Hedrick et al. |
| 6,702,671 B2 | 3/2004 | Tarantino |
| 6,743,095 B2 | 6/2004 | Cole et al. |
| 6,860,814 B2 | 3/2005 | Cole |
| 6,870,114 B2 | 3/2005 | Cole et al. |
| 6,935,950 B2 | 8/2005 | Tarantino |
| 6,976,919 B2 | 12/2005 | Cole |
| 6,987,233 B2 | 1/2006 | Cole et al. |
| 6,997,810 B2 | 2/2006 | Cole |
| 7,011,581 B2 | 3/2006 | Cole et al. |
| 7,025,676 B2 | 4/2006 | Cole et al. |
| 2001/0015310 A1 | 8/2001 | Cole |
| 2002/0019210 A1 | 2/2002 | Cole |
| 2003/0078102 A1 * | 4/2003 | Okita et al. ............... 463/42 |
| 2003/0214458 A1 * | 11/2003 | Giemborek et al. ......... 345/1.1 |
| 2004/0018870 A1 | 1/2004 | Cole |
| 2004/0082373 A1 | 4/2004 | Cole et al. |
| 2004/0087374 A1 | 5/2004 | Cole |
| 2004/0100479 A1 * | 5/2004 | Nakano et al. ............. 345/700 |
| 2004/0137978 A1 | 7/2004 | Cole et al. |
| 2004/0196265 A1 * | 10/2004 | Nohr ......................... 345/169 |
| 2005/0026702 A1 | 2/2005 | Cole |
| 2005/0143176 A1 | 6/2005 | Cole |
| 2005/0255924 A1 | 11/2005 | Cole |
| 2006/0030412 A1 | 2/2006 | Cole |
| 2006/0073900 A1 | 4/2006 | Cole |

* cited by examiner

US 7,601,067 B2

DUAL HINGE MOUNTING ARRANGEMENT

BACKGROUND OF THE INVENTION

Various gaming devices for use in casinos, taverns, and the like have been developed. Gaming devices typically include a cabinet that houses various internal components. The internal components may include a variety of electronic and mechanical devices for game play, receipt of money, and dispensing a player's winnings. The appearance of gaming cabinets is important because the appearance may be a substantial factor in drawing a user to the game, and also affects a user's perception of the gaming experience. Also, structural integrity is important in providing durability and preventing unauthorized access to the game components and money in the gaming cabinet.

Cabinets for gaming devices and the like often include one or more openings that are selectively closed off by doors to provide access to the internal components of the gaming device. Known door mounting arrangements may expose the door hinge, thereby distracting from the appearance of the gaming cabinet. Also, an exposed hinge may create problems related to preventing unauthorized entry or break in to the cabinet. Thus, a hinge mounting arrangement alleviating the problems associated with known door mounting arrangements would be desirable.

SUMMARY OF THE INVENTION

One aspect of the present invention is a gaming device including a cabinet having front and rear surfaces, and side surfaces extending between the front and rear surfaces to define an interior space configured to house gaming components. The cabinet includes an enlarged opening providing access to the interior space. A first door is pivotally mounted to the cabinet for rotation about a first axis. A second door is pivotally mounted to the cabinet for rotation about a second axis that is generally parallel to the first axis. The first axis is spaced apart from the second axis to form a gap therebetween. The first door defines an elongated first edge adjacent to the first axis, and the second door defines an elongated second edge that extends across the gap between the first axis and the second axis.

Another aspect of the present invention is a cabinet for gaming devices including a generally upright cabinet structure with front and rear faces, and side faces extending between the front and rear faces to define an interior space. At least one of the faces of the cabinet structure has first and second enlarged openings providing access to the interior space. The cabinet structure includes an elongated mounting structure between the first and second openings. The cabinet further includes a first door and a second door. A first hinge pivotally connects the first door to the elongated mounting structure for rotation about a first axis to selectively close off the first enlarged opening. A second hinge pivotally connects the second door to the elongated mounting structure for rotation about a second axis to selectively close off the second enlarged opening. The second axis is parallel to the first axis and spaced apart from the first axis to define a gap. The first door includes a flange extending across at least a portion of the gap towards the second door.

Yet another aspect of the present invention is a door assembly for closing off a pair of adjacent openings in a cabinet. The door assembly includes a mounting structure having a base portion and first and second spaced-apart leg portions extending from the base portion. A first hinge has a first hinge part connected to the first leg portion of the mounting structure. The first hinge also has a second hinge part that is pivotally connected to the first hinge half. The door assembly further includes a second hinge having a first hinge part connected to the second leg of the mounting structure and a second hinge part that is pivotally connected to the first hinge part for rotation about a first axis. A first door is connected to the second hinge part of the first hinge, and a second door is connected to the second hinge part of the second hinge for rotation about a second axis that is spaced apart from the first axis to form a gap. The first door includes a flange extending across at least a portion of the gap.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 1:
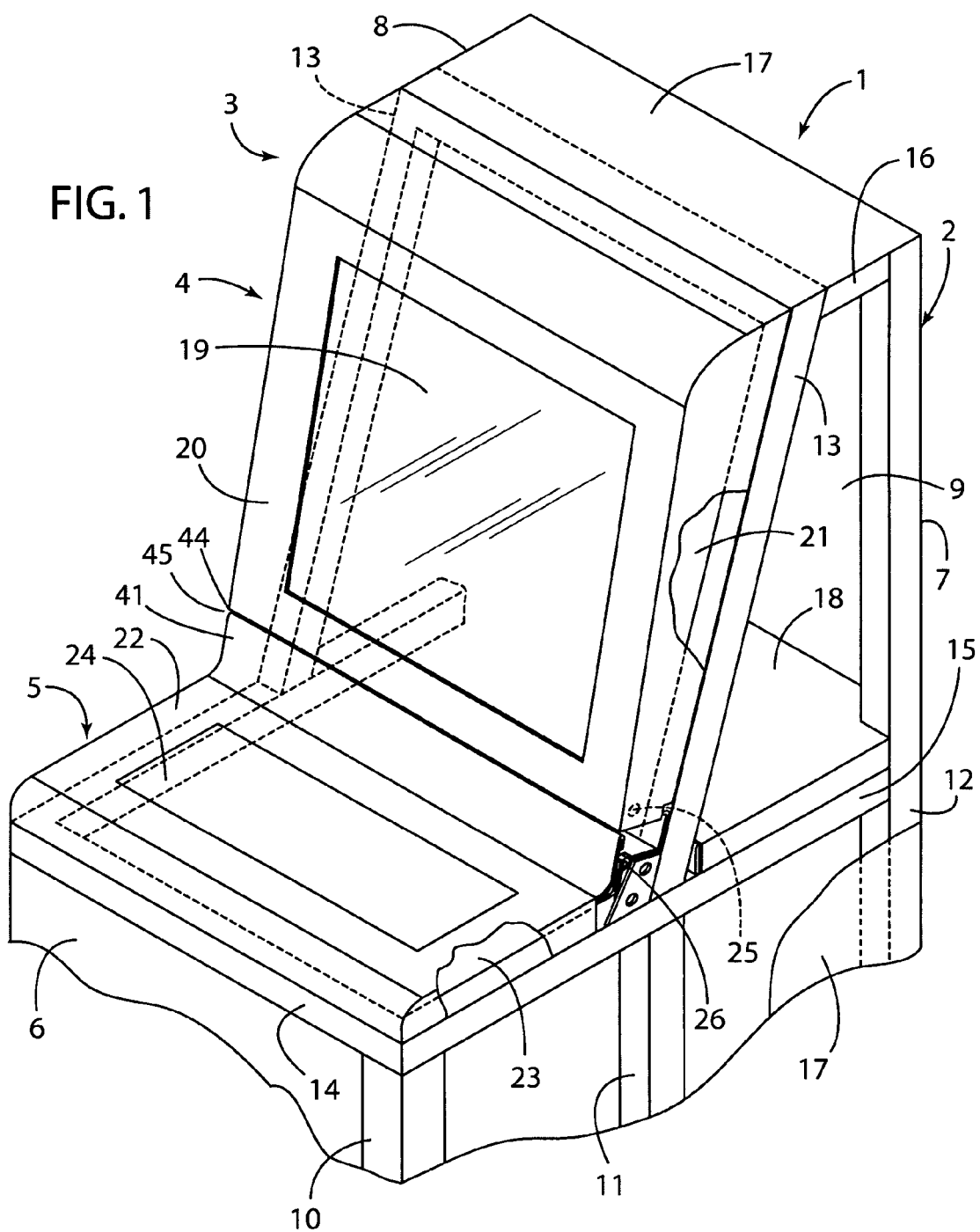
FIG. 1 is a partially fragmentary perspective view of a gaming device having a cabinet that includes a hinge mounting arrangement according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

A gaming device 1 according to one aspect of the present invention includes a cabinet structure 2 including a front face 3 having an upper portion 4, a generally horizontal step portion 5 and a lower portion 6. The cabinet structure 2 also includes a rear face 7 and side faces 8 extending between the front face 3 and rear face 7 to define an interior space 9. A plurality of electronic and/or mechanical gaming components (not shown) can be mounted in the interior space. A shelf 18 may be positioned within the interior space 9 to support components of the gaming device within the cabinet structure 2. In the illustrated example, the cabinet structure includes a plurality of upright structural members 10, 11, 12 and 13 that are interconnected with horizontal structural members 14 and 15. Sheets of metal 17 or other suitable material is utilized to form the outer surface of the cabinet.

An upper door 20 closes off an enlarged upper opening 21 in the front face 3 of the cabinet structure 2, and a lower door 22 closes off an enlarged lower opening 23 in the horizontal step portion 5 of front face 3. Door 20 may have an enlarged opening that is closed off by one or more light-transmitting sheets 19 that cover an electronic display screen (not shown) or other internal electromechanical gaming devices such as reel assemblies or the like. Door 22 may include an opening 24 for mounting mounting game controls such as push buttons or the like (not shown).

As described in more detail below, a flange 41 of door 22 covers piano hinges 25 and 26 that pivotably mount doors 20 and 22, respectively, to cabinet structure 2. Flange 41 provides a very smooth and uncluttered appearance for the front of the cabinet, and also prevents unauthorized access due to tampering with hinges 25 and 26. A very narrow gap 45 between flange 41 and lower edge 44 of upper door 20 does not detract from the appearance of the cabinet, and prevents access.

Figure 2:
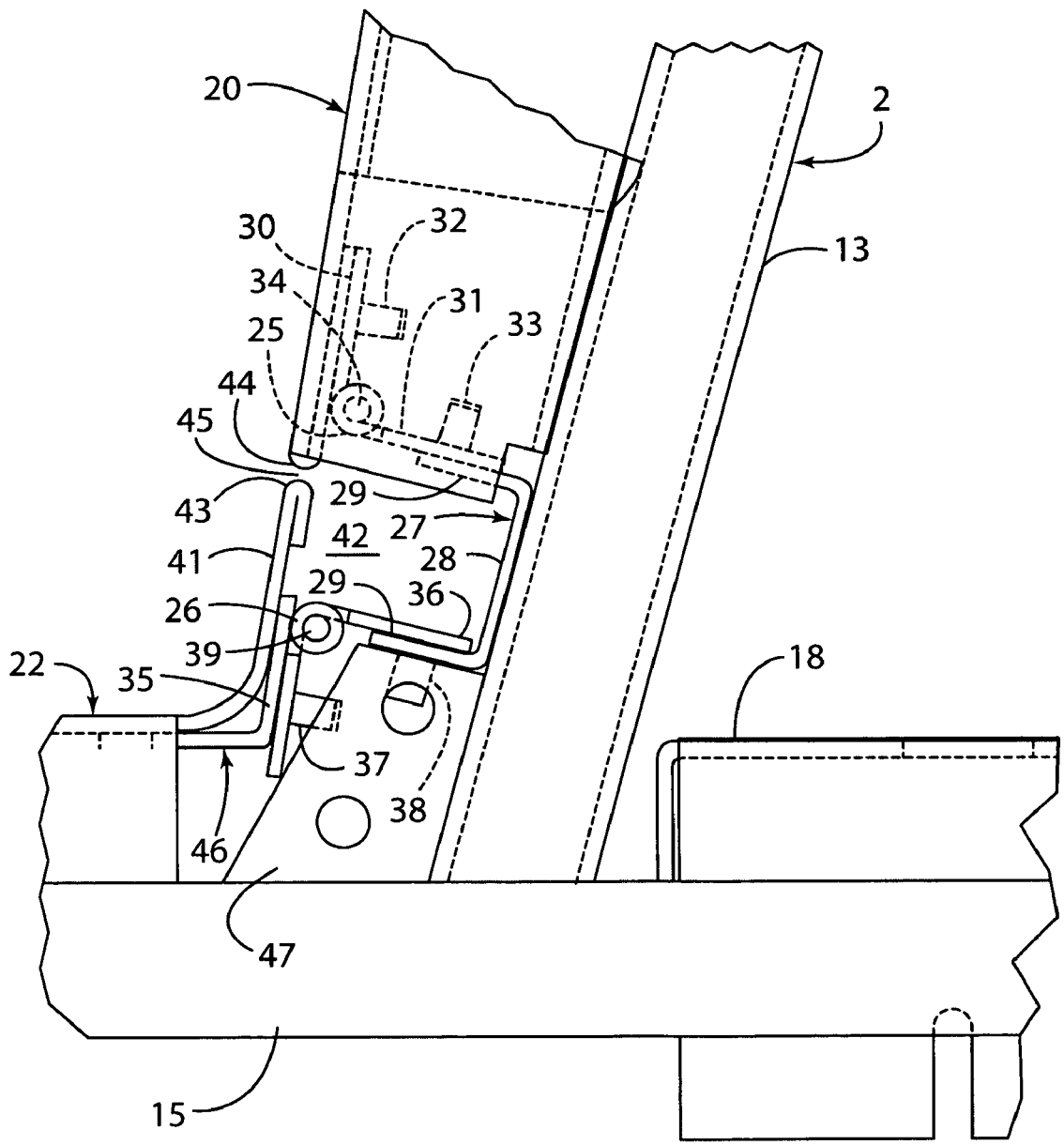
FIG. 2 is a fragmentary view of a gaming cabinet having a hinge mounting arrangement according to the present invention.

With further reference to FIG. 2, piano hinges 25 and 26 are mounted to an elongated U-shaped bracket 27 to thereby pivotably mount the doors 20 and 22 to the cabinet structure 2. U-shaped bracket 27 includes a flat web or base portion 28, and flange or leg portions 29 that extend transversely from the base portion 28. The base portion 28 may be secured to the cabinet structure by welding, or other conventional fasteners or the like (not shown). Piano hinge 25 includes a first hinge half 30 that is secured to the door 20 utilizing a conventional fastener 32 such as a screw or the like. Hinge 25 also includes a second hinge half 31 that is secured to leg 29 of bracket 27 by a conventional fastener 33 or the like. An elongated pin 34 pivotably interconnects the first and second hinge halves 30 and 31 to form an axis. Piano hinge 26 includes a first hinge half 35 that is secured to door 22 by fasteners 37, and also includes a second hinge half 36 that is secured to a leg portion 29 of bracket 27 by conventional fasteners 38. An elongated pin 39 pivotably interconnects the first and second halves 35 and 36 to form a second pivot axis. In the illustrated example, elongated bracket 27 and hinges 25 and 26 extend across substantially the entire width of cabinet structure 2 and doors 20 and 22. However, a plurality of shorter brackets and/or hinges or other such arrangements could also be utilized.

The pivot axis formed by pivot pins 34 and 39 are spaced apart to form an elongated gap 42 between the door 20 and door 22. Lower door 22 includes a flange 41 that extends across gap 42. The edge 43 of flange 41 is positioned approximate edge 44 of door 20. The flange 41 thereby provides a very small gap 45 between the doors 20 and 22, and also visually hides the hinges 25 and 26 to provide an unobstructed appearance. Reinforcing members 46 and 47 may be utilized to provide support for mounting of the piano hinge 26 and bracket 27, respectively.

Figure 3:
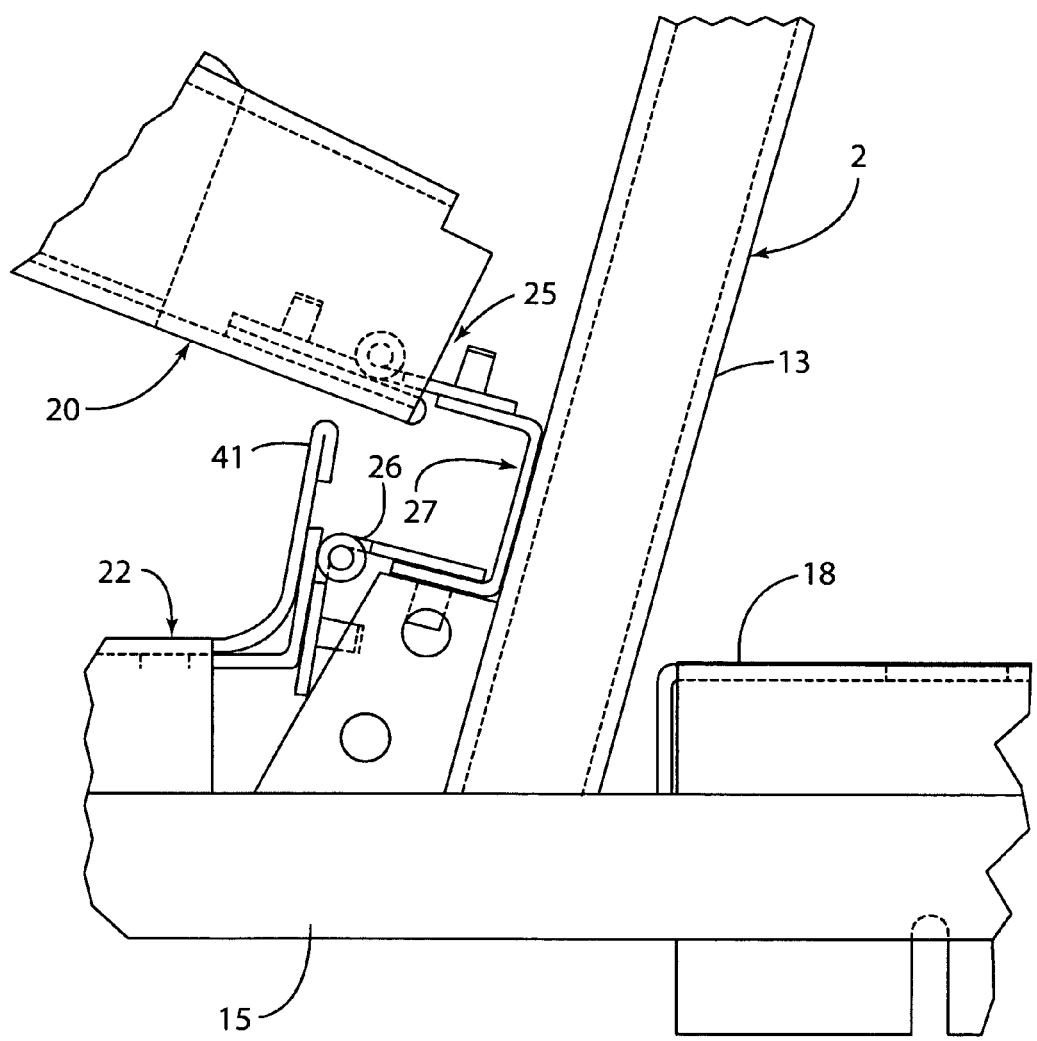
FIG. 3 shows the hinge mounting arrangement of FIG. 2 with the upper door in an opened position.
Figure 4:
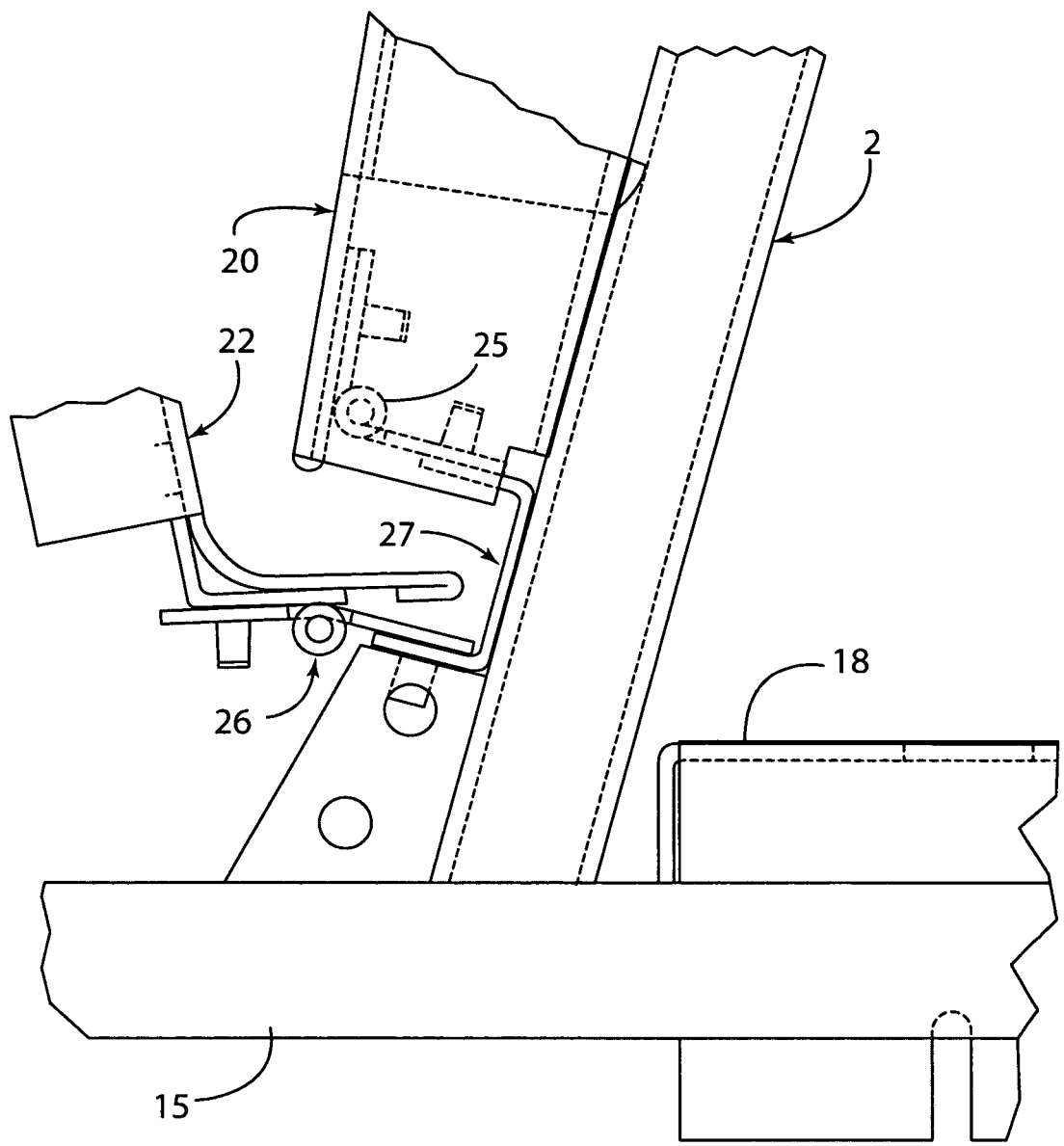
FIG. 4 shows the hinge mounting arrangement of FIG. 2 with the lower door in an opened position.

As illustrated in FIGS. 3 and 4, the mounting arrangement of the hinges 25 and 26 permits the upper door 20 or lower door 22 to be opened. Thus, standard piano hinges or the like may be utilized to mount the doors to the cabinet while also providing a clean, uncluttered appearance at the front of the cabinet.

Figure 5:
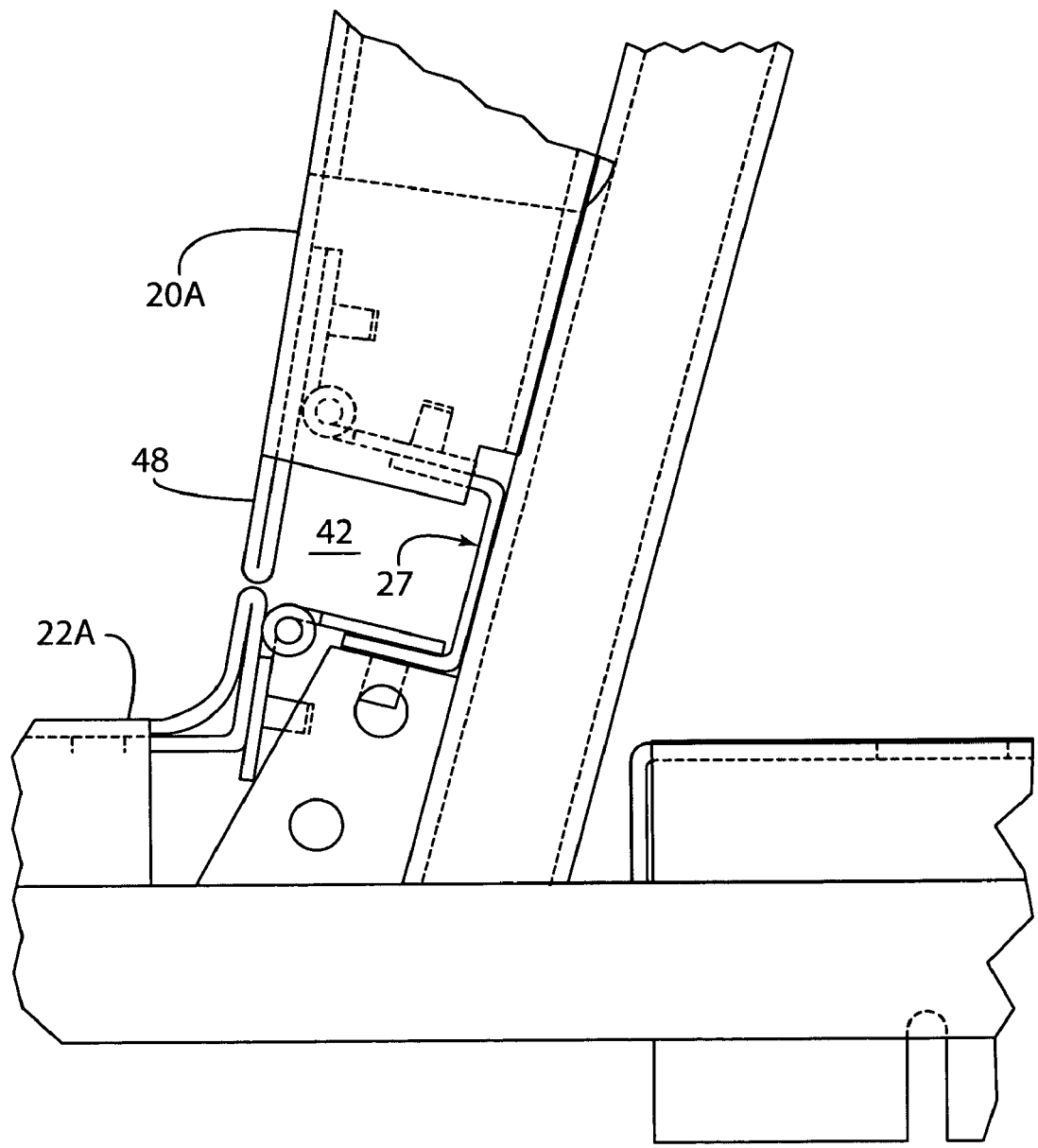
FIG. 5 is a view of a gaming cabinet having a hinge mounting arrangement according to another aspect of the present invention.
Figure 6:
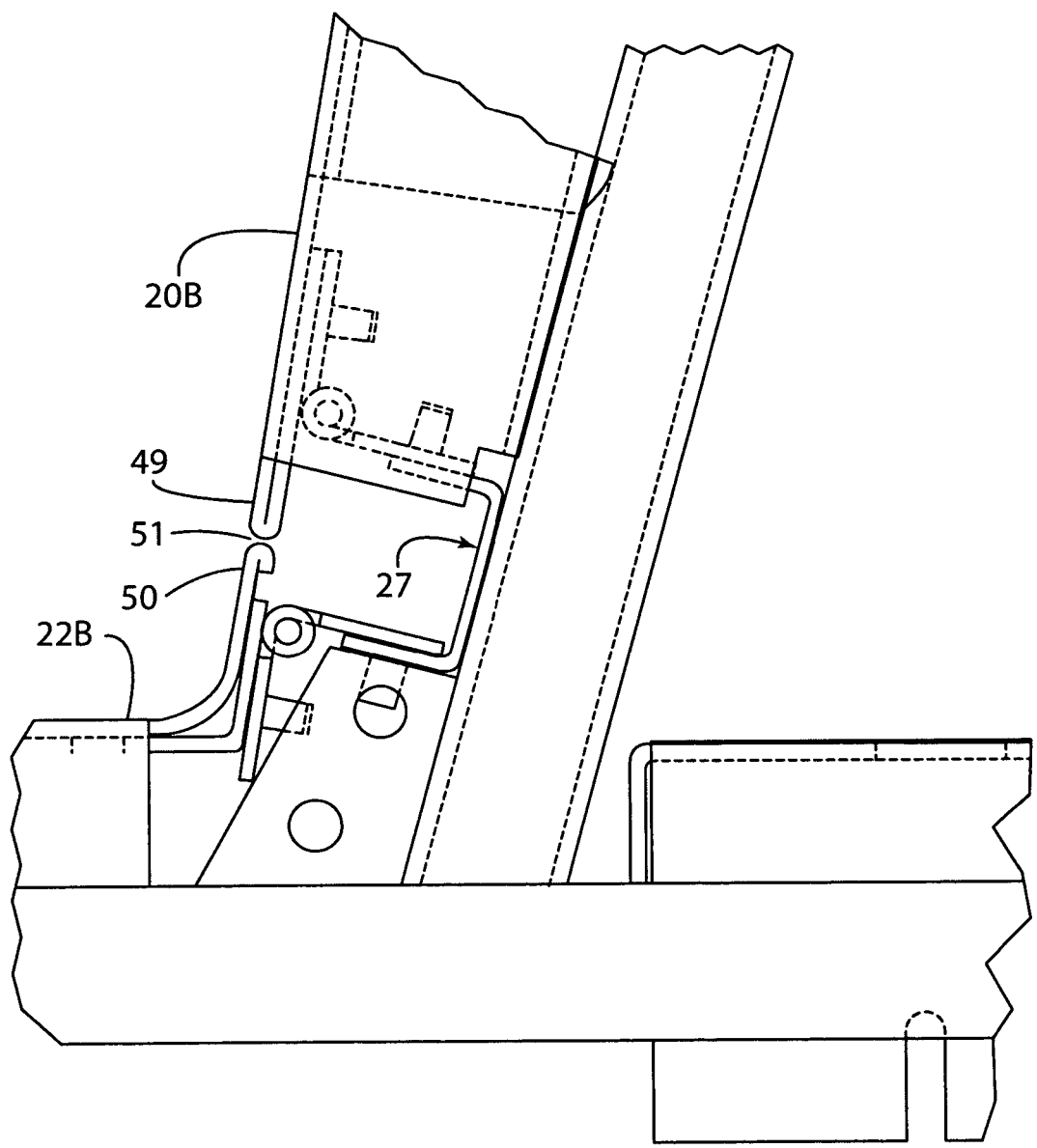
FIG. 6 is a view of a gaming cabinet having a hinge mounting arrangement according to yet another aspect of the present invention.

With further reference to FIG. 5, it will be understood that an upper door 20a may include a flange 48 extending across gap 42. Alternately, as illustrated in FIG. 6, an upper door 20b may include a short flange 49, and lower door 22b may also include a short flange 50. The flanges 49 and 50 extend towards one another and create a small gap 51.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A gaming device, comprising:
   a cabinet having front and rear surfaces, and side surfaces extending between the front and rear surfaces to define an interior space configured to house gaming components, the cabinet including an enlarged opening providing access to the interior space;
   a first door pivotably mounted to the cabinet for rotation about a first axis, the first door rotating a closed position closing off a first portion of the opening, and an open position providing access to the interior space through the first portion of the enlarged opening;
   a second door pivotably mounted to the cabinet for rotation about a second axis that is generally parallel to the first axis, the second door rotating between a closed position closing off a second portion of the opening, and an open position providing access to the interior space through the second portion of the enlarged opening; wherein the first axis is spaced apart from the second axis to form a gap therebetween;
   the first door defining an elongated first edge adjacent to the first axis;
   the second door defining an elongated second edge that extends across the gap between the first axis and the second axis, wherein the second edge moves inwardly towards the interior space as the first door is moved from the closed position to the open position, and wherein the first and second axes extend across the enlarged opening between the first and second portions of the enlarged opening; and wherein:
   the cabinet includes structure disposed between the first and second axes that blocks access to the interior space of the cabinet when either or both of the first and second doors are in their respective open positions.

2. The gaming device of claim 1, wherein:
   the first and second axes extend horizontally.

3. The gaming device of claim 1, wherein:
   the front face includes an upper portion;
   the cabinet includes an upwardly-facing step extending between the upper portion of the front face and the lower portion of the front face to define a horizontally-extending junction at an intersection of the step and the upper portion of the front face; and wherein:
   the first and second axes are located adjacent the junction.

4. The gaming device of claim 3, wherein:
   the step defines an upwardly-facing top side, and the second portion of the enlarged opening is formed in the top side of the step.

5. The gaming device of claim 1, wherein:
   the first door includes a flange that extends away from the first axis across the gap between the first and second axes.

6. The gaming device of claim 5, wherein:
   the flange defines a distal end that forms the first edge.

7. The gaming device of claim 5, wherein:
   the flange on the first door comprises a first flange;
   the second door includes a second flange extending towards the first flange.

8. The gaming device of claim 5, wherein:
the second door comprises a substantially planar face surface, and the flange has a substantially planar surface that is coplanar with the substantially planar face surface.

9. The gaming device of claim 1, wherein:
the structure disposed between the first and second axes comprises a horizontal support structure; and including:
first and second hinges pivotally connecting the first and second doors, respectively, to the horizontal support structure.

10. The gaming device of claim 1, wherein:
at least a portion of the enlarged opening is through the front face of the cabinet.

11. The gaming device of claim 10, wherein:
the first door is generally upright when in a closed position, and includes an enlarged viewing opening therethrough; and including:
a light-transmitting sheet extending across the enlarged viewing opening.

12. The gaming device of claim 1, wherein:
the first door includes a substantially planar first flange forming the first edge;
the second door includes a substantially planar second flange forming the second edge; and wherein:
the first and second flanges extend towards one another.

13. The gaming device of claim 12, wherein:
the first and second flanges are coplanar.

14. A cabinet for gaming devices, comprising: a generally upright cabinet structure including front and rear faces, and side faces extending between the front and rear faces to define an interior space, at least one of the faces of the structure having first and second enlarged openings providing access to the interior space, including an elongated mounting structure between the first and second openings;
a first door;
a second door;
a first hinge pivotally connecting the first door to the elongated mounting structure providing rotation of the first door about a first axis relative to the elongated mounting structure between open and closed positions to selectively close off the first enlarged opening;
a second hinge pivotally connecting the second door to the elongated mounting structure between open and closed positions to selectively close off the second enlarged opening, wherein the second axis is parallel to the first axis and spaced apart from the first axis to define a gap; and wherein:
the first door includes a flange extending across at least a portion of the gap towards the second door wherein the flange moves inwardly towards the interior space as the first door is moved from the closed position to the open position, and wherein the first and second axes extend between the first and second enlarged openings; and wherein the elongated mounting structure does not move with either the first door or the second door.

15. The cabinet of claim 14, wherein:
the first and second hinges comprise piano hinges.

16. The cabinet of claim 14, wherein:
the elongated mounting structure includes a bracket having a U-shaped cross section.

17. The cabinet of claim 14, wherein:
the elongated mounting structure includes a bracket having a base portion and a pair of flanges extending from the base portion to form a U-shaped cross section;
the first and second hinges each include first and second hinge halves that are pivotably interconnected and wherein the first hinge halves are connected to the flanges of the bracket, and the second hinge halves are connected to the first and second doors.

18. The cabinet of claim 17, wherein:
the front face of the cabinet includes a generally horizontally extending step on a front side of the cabinet dividing the front face into upper and lower portions;
the first enlarged opening is formed by a quadrilateral perimeter in the upper portion of the front face of the cabinet structure;
the second enlarged opening is formed by a quadrilateral perimeter in the step;
the bracket extends horizontally across the front face of the cabinet structure between the first and second enlarged openings.

19. A cabinet, comprising:
a cabinet defining a hollow interior and first and second openings and an elongated mounting structure disposed between the first and second openings, wherein the mounting structure is fixed to the cabinet, and includes a base portion and first and second spaced-apart leg portions extending from the base portion outwardly away from the hollow interior;
a first hinge having a first hinge part connected to the first leg portion of the mounting structure, and a second hinge part pivotably connected to the first hinge half for rotation about a first axis;
a second hinge having a first hinge part connected to the second leg of the mounting structure and a second hinge part pivotably connected to the first hinge part for rotation about a second axis;
a first door connected to the second hinge part of the first hinge for rotation about the first axis between open and closed positions;
a second door connected to the second hinge part of the second hinge for rotation about the second axis between open and closed positions, wherein the second axis is spaced apart from the first axis to form a gap; and wherein:
the first door includes a flange extending across at least a portion of the gap, wherein the flange moves inwardly towards the hollow interior as the first door is moved from the closed position to the open position, and wherein the first and second axes extend between the first and second openings.

20. The cabinet of claim 19, wherein:
the mounting structure comprises an elongated bracket having a web forming the base portion and flanges extending from the base forming the leg portions, the base and legs having a U-shaped cross section; and wherein:
the first and second hinges comprise elongated piano hinges.

* * * * *

UNITED STATES PATENT AND TRADEMARK OFFICE
CERTIFICATE OF CORRECTION

PATENT NO. : 7,601,067 B2  Page 1 of 1
APPLICATION NO. : 11/073957
DATED : October 13, 2009
INVENTOR(S) : Brian M. Anderson It is certified that error appears in the above-identified patent and that said Letters Patent is hereby corrected as shown below:

Column 4, line 16, after "rotating" insert --between--.

Signed and Sealed this

Twenty-ninth Day of June, 2010

David J. Kappos
*Director of the United States Patent and Trademark Office*